(12) United States Patent
Wilkowske

(10) Patent No.: US 8,371,547 B2
(45) Date of Patent: Feb. 12, 2013

(54) DETECTOR EXTENDER SUPPORT SYSTEMS

(76) Inventor: Kathleen N. Wilkowske, Montgomery, AL (US)

( * ) Notice: Subject to any disclaimer, the term of this patent is extended or adjusted under 35 U.S.C. 154(b) by 74 days.

(21) Appl. No.: 13/205,549

(22) Filed: Aug. 8, 2011

(65) Prior Publication Data

US 2012/0043440 A1  Feb. 23, 2012

Related U.S. Application Data

(60) Provisional application No. 61/375,422, filed on Aug. 20, 2010.

(51) Int. Cl.
*A47F 5/00* (2006.01)
(52) U.S. Cl. .......................... 248/310; 248/342; 294/209
(58) Field of Classification Search .................. 248/342, 248/339, 309.1, 310, 216.4, 225.21; 294/209; 340/628
See application file for complete search history.

(56) References Cited

U.S. PATENT DOCUMENTS

| | | |
|---|---|---|
| 5,563,766 A | 10/1996 | Long et al. |
| 6,591,716 B2 | 7/2003 | Wantz |
| 6,672,636 B2 | 1/2004 | Kelly |
| 6,859,146 B2 | 2/2005 | McGreal et al. |
| 7,587,926 B2 | 9/2009 | Ackerman |
| 2004/0065798 A1 | 4/2004 | Pitlor |
| 2011/0290971 A1* | 12/2011 | Molter ........................ 248/276.1 |

* cited by examiner

*Primary Examiner* — Ramon Ramirez
(74) *Attorney, Agent, or Firm* — RG Patent Consulting LLC; Rachel Gilboy

(57) ABSTRACT

A detector extender support system for facilitating ease of accessing battery operated detectors, such as smoke alarms and carbon monoxide alarms, without the use of a ladder or other elevation device. Detector extender support system may generally comprise an extender handle comprising a distal end and a proximal end. The distal end of the extender handle may comprise a round, disk-shaped detector support comprising a substantially planar surface to which the base of a battery operated detector may be fastened to via a set of screws. A hook may be securely attached to a top portion of the distal end of the extender handle so that the detector extender support system may be hung from a nail, screw, or other wall fastener. The proximal end of the extender handle may comprise a curvy, ergonomic profile facilitating ease of use. The detector extender support system enables a user to remotely access the detector mechanism for manipulation and service.

20 Claims, 7 Drawing Sheets

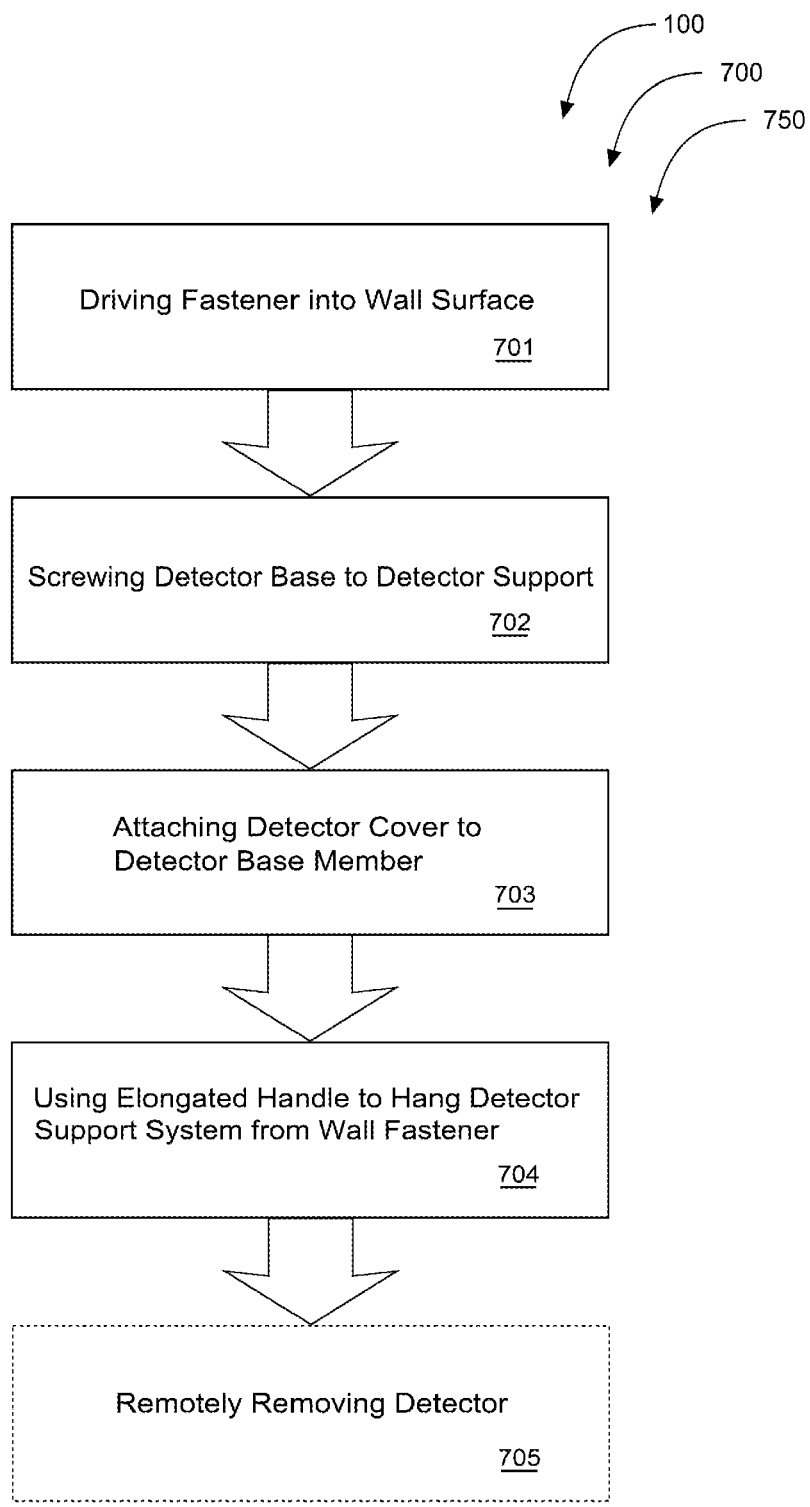

DETECTOR EXTENDER SUPPORT SYSTEMS

CROSS-REFERENCE TO RELATED APPLICATION

The present application is related to and claims priority from prior provisional application Ser. No. 61/375,422, filed Aug. 20, 2010 which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

FIELD OF THE INVENTION

The present invention relates generally to the field of extender handles and more specifically relates to an improved extender support handle for wall mounted detectors and alarms.

DESCRIPTION OF THE RELATED ART

While cooking, reheating food, or making toast, the food may become burned or overheated, causing consumers' smoke detectors to be activated. In cases of mild smoke, the detectors may simply be removed from the wall so that consumers are able to clear smoke away to deactivate the alarm. Detectors are often placed high up on ceilings or walls, requiring consumers to stand on ladders or chairs to access them. This may prove very difficult for individuals who are elderly, fragile, or who have imperfect vision. Further, standing on elevated surfaces may unfortunately put all individuals at risk of falling and incurring severe injuries, or may prevent the checking and changing of batteries in their detectors. An effective solution is necessary.

Various attempts have been made to solve the above-mentioned problems such as those found in Pub. Nos. and U.S. Pat. Nos. 7,587,926 to Ackerman; 6,591,716 to Wantz; 5,563,766 to Long; 6,672,636 to Kelly; 6,859,146 to McGreal et al; and 2004/0065798 to Pitlor. This prior art is representative of devices with extenders for detectors. None of the above inventions and patents, taken either singly or in combination, is seen to describe the invention as claimed.

Ideally, an extending device for a detector should enable a user to easily and conveniently access the detector without the need to climb on furniture, step on a chair, or use a ladder, and, yet would operate reliably, comprise an aesthetic appearance, and be manufactured at a modest expense. Thus, a need exists for a reliable detector extender support system to conveniently access a detector mechanism from an out-of-reach wall surface and to avoid the above-mentioned problems.

BRIEF SUMMARY OF THE INVENTION

In view of the foregoing disadvantages inherent in the known detector mechanism extender handle art, the present invention provides a novel detector extender support system. The general purpose of the present invention, which will be described subsequently in greater detail is to provide an ergonomic, extender handle to remotely access a detector mechanism for easy manipulation and replacement to its in-use condition.

Detector extender support system may facilitate ease of accessing smoke and carbon monoxide alarms without the use of a ladder or other elevation device. Detector extender support system as disclosed herein may generally comprise an extender handle comprising a distal end and a proximal end. The distal end of the extender handle may comprise a round, disk-shaped detector support comprising a substantially planar surface for supporting a battery operated detector. A hook may be securely attached to a top portion of the distal end of the extender handle. The hook may be used to hang the detector extender support system from a wall fastener, such as a nail or screw.

The proximal end of the extender handle may comprise a plurality of curves. Each curve may serve as a handle grip for a user. The plurality of curves enables users of different heights to easily use the extender handle. For example, a user who may be very tall may grasp a handle curve which is higher on the extender handle while a user who may be shorter may grasp handle curve which is lower on the extender handle. Further, the ergonomic nature of the curvy profile of the detector extender support system may serve to enable both right-handed users and left-handed users to comfortably and effectively grip the detector extender support system.

To use the detector extender support device of the present invention, the user may securely fasten the base of a battery operated detector mechanism, such as a smoke alarm or carbon monoxide alarm, to the detector support of the extender handle via a pair of screws that are provided with the present invention. The user may then insert a wall fastener provided with the present invention into a user-preferred location on a wall surface close to the ceiling. Then, the user may hold the distal end of the extender handle by grasping one of the handle curves and hang the detector extender support system by swinging the extender handle toward the wall fastener. The cup hook may catch onto the wall fastener, thereby allowing the device to be hung for optimal accessibility. The detector extender support system may thereby permit the user to remotely access the detector for easy manipulation and replacement.

The present invention holds significant improvements and serves as a detector extender support system. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, detector extender support system, constructed and operative according to the teachings of the present invention.

FIG. 7 is a flowchart illustrating a method of use according to an embodiment of the present invention of FIGS. 1-6.

The various embodiments of the present invention will hereinafter be described in conjunction with the appended drawings, wherein like designations denote like elements.

DETAILED DESCRIPTION

As discussed above, embodiments of the present invention relate to a detector extender support device and more particularly to a detector extender support as used to improve the remote accessibility to detector mechanisms. Detectors, such as smoke and carbon monoxide alarms, provide an important role in society in alerting dwelling occupants of a hazardous condition. However, because carbon monoxide and smoke possess an inherent tendency to rise, most detectors are positioned on the ceiling or high on a wall surface usually close to a ceiling. In many homes and buildings, the ceiling might be on average anywhere from 8 to 12 feet high. Some ceilings may be even higher.

Consequently, when a dwelling occupant wishes to access the detector mechanism, the person may resort to climbing on furniture (ie. the back of a couch, standing on a chair) in order to reach the detector. This may unnecessarily increase a risk of injury to the person due to falling from a loss of balance or from over stretching a muscle.

Furthermore, individuals such as the elderly or the handicapped may be unable to step onto a step stool or climb a ladder to access the detector mechanism. Consequently, when a smoke alarm goes off because the individual has burned toast or the batteries simply need to be changed; such individuals may have to wait for assistance from somebody else to perform the routine task. Therefore, a primary objective of the present invention is to enable an individual to easily access a battery operated detector mechanism via an extender handle.

Figure 1:
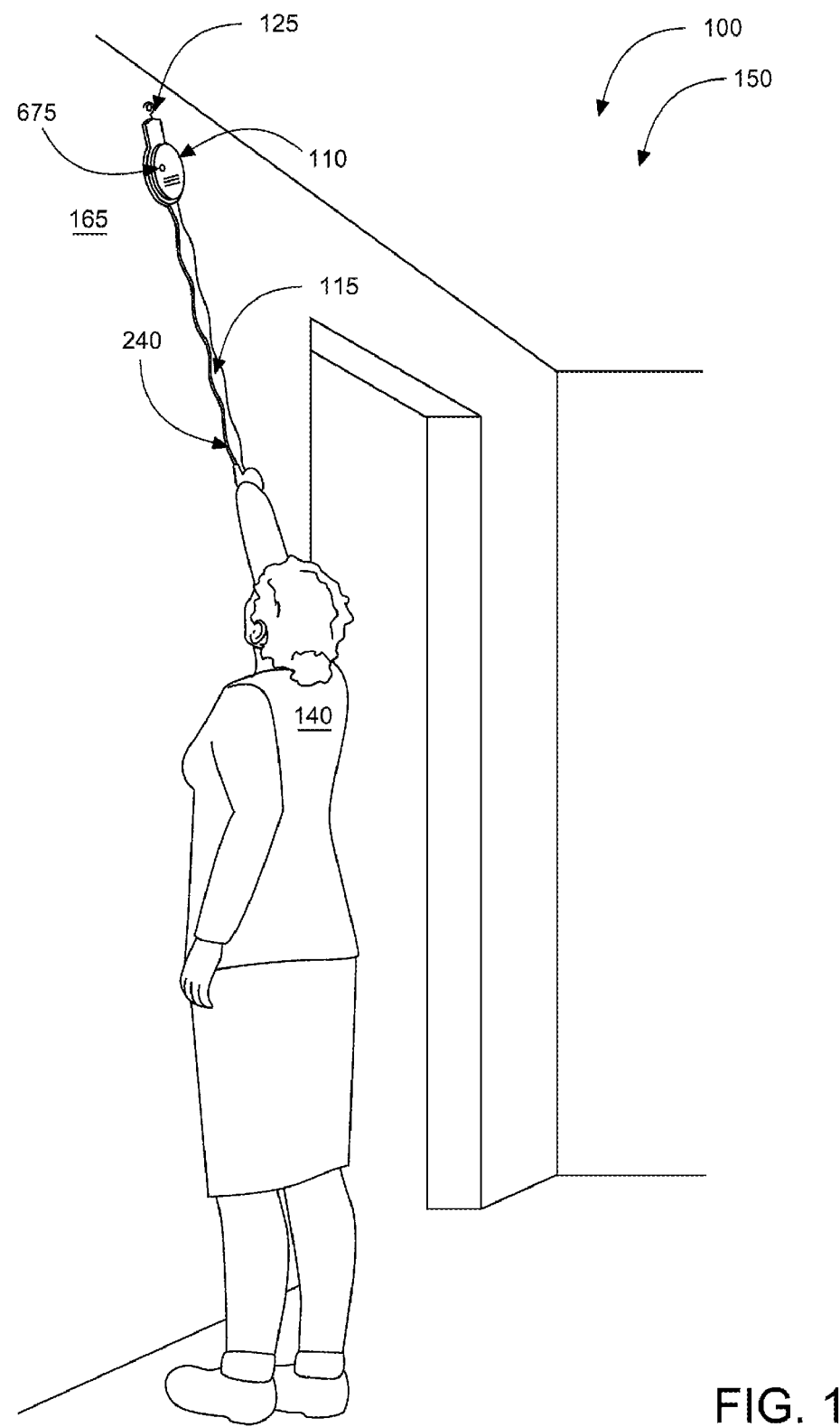
FIG. 1 shows a perspective view illustrating a detector extender support system in an 'in-use' condition according to an embodiment of the present invention

Referring to the drawings by numerals of reference there is shown in FIG. 1, detector extender support system 100 in 'in-use' condition 150 according to a preferred embodiment of the present invention. As shown, detector extender support system 100 may generally comprise extender handle 115. Extender handle 115 preferably includes a distal end and a proximal end. Cup hook 125 may be securely attached to a top surface of the distal end of extender handle 115. Further, extender handle 115 may comprise a means for securely attaching detector base member 310 of detector mechanism 110. In use, user 140 may grip extender handle 115 to remove detector extender support system 100 from wall surface 165 in order to access detector mechanism 110. As shown in FIG. 1, detector mechanism 110 may comprise smoke alarm 675 or other battery-operated alarm.

Figure 2:
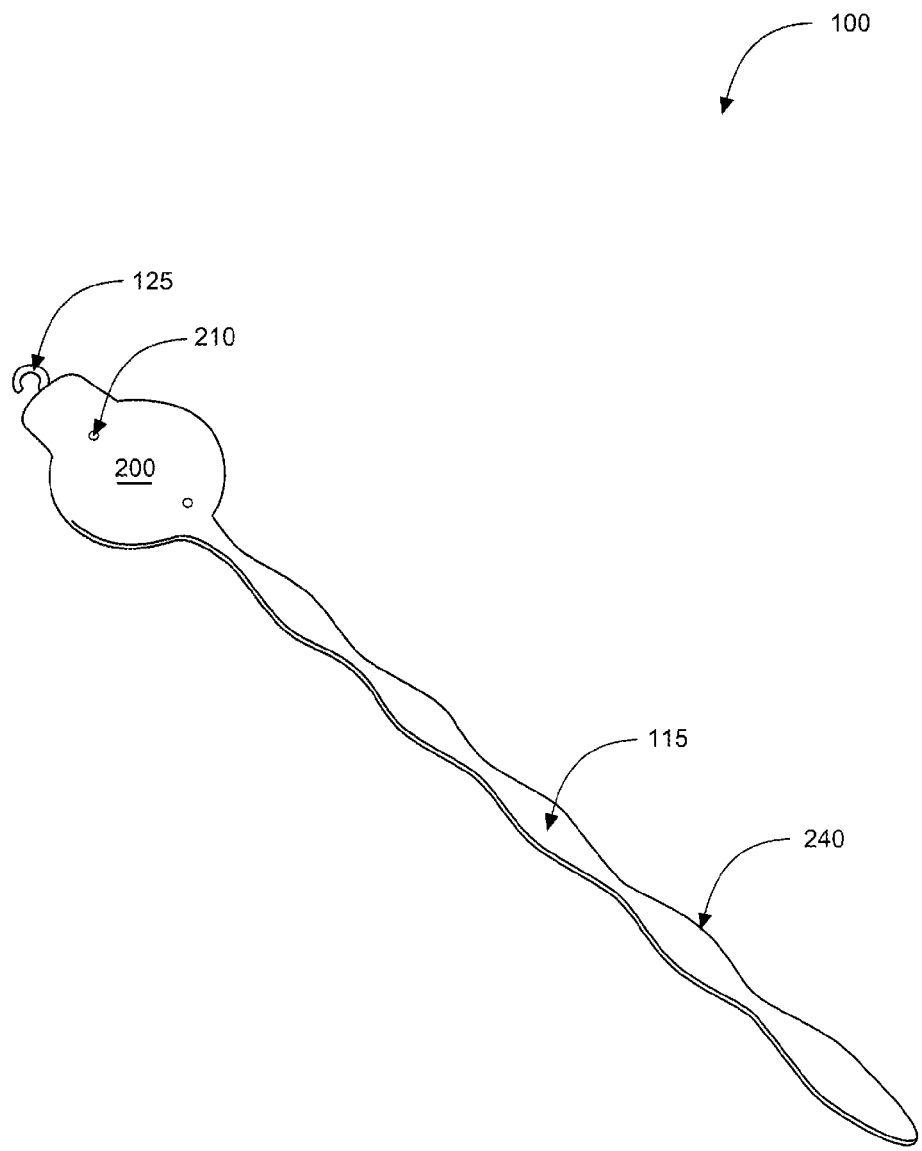
FIG. 2 is a perspective view illustrating the detector extender support system according to an embodiment of the present invention of FIG. 1.

Referring now to FIG. 2, illustrating a perspective view of detector extender support system 100 according to an embodiment of the present invention of FIG. 1. As shown, detector extender support system 100 may comprise detector support 200 located at the distal end of extender handle 115. Detector support 200 comprises a round, disk-shaped member comprising a substantially planar surface for supporting detector mechanism 110. Detector support 200 may further comprise at least two screw holes 210. Preferably, screw holes 210 are located on opposite ends of detector support 200 for optimal stability of detector mechanism 110 in an in-use condition 150. It should be noted that the present invention may comprise at least two screws for the convenience of user 140.

In continuing to refer to FIG. 2, extender handle 115 may comprise a plurality of handle curves 240. Handle curve 240 may comprise an ergonomic profile enabling user 140 to comfortably grip extender handle 115. Further, the ergonomic profile of handle curve 240 may serve to provide increased swinging leverage when positioning extender handle 115 along wall surface 165. The plurality of handle curves 240 may enable users of different heights to effectively manipulate extender handle 115 as user 140 may grip handle curve 240 that is suitable for their height.

In a preferred embodiment, detector extender support system 100 may comprise finished wood. However in alternative embodiments detector extender support system 100 may comprise plastic or other suitable material.

In an alternate embodiment of detector extender support system 100, extender handle 115 may comprise a spiral design. It should be appreciated that extender handle 115 may comprise other physical shapes or designs based on user preference. Further, extender handle 115 may comprise colorful indicia, personalized emblems, or other designs to improve the aesthetic appearance of detector extender support system 100. It should further be noted that detector support 200 may comprise varying sizes to accommodate detector mechanism 110 of different shapes and sizes. For instance, detector support 200 may comprise a larger shaped circular profile for accommodating detector mechanism 110 comprising a larger detector base member 310.

Figure 3:
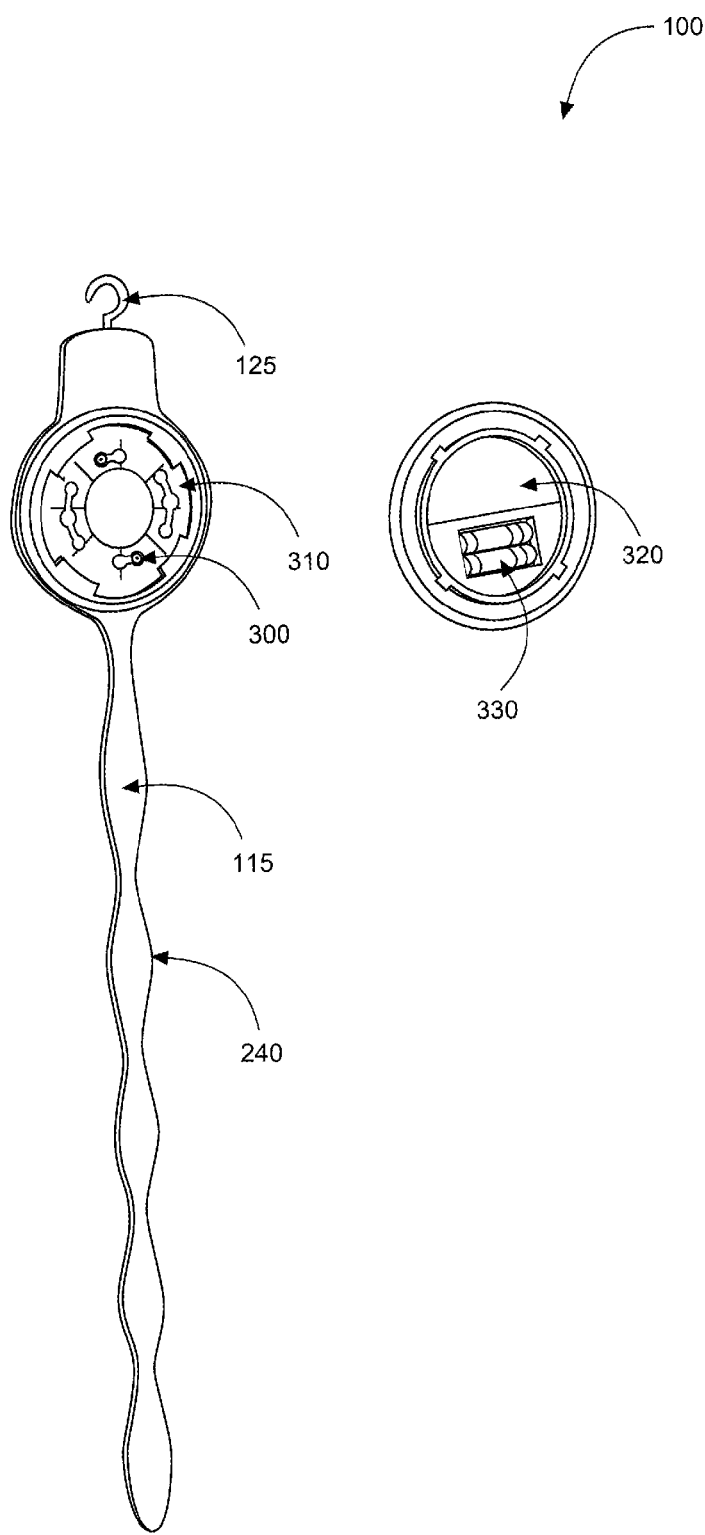
FIG. 3 is a perspective view illustrating a detector base member securably fastened to a detector support via a set of screws according to an embodiment of the present invention of FIG. 1.
Figure 4:
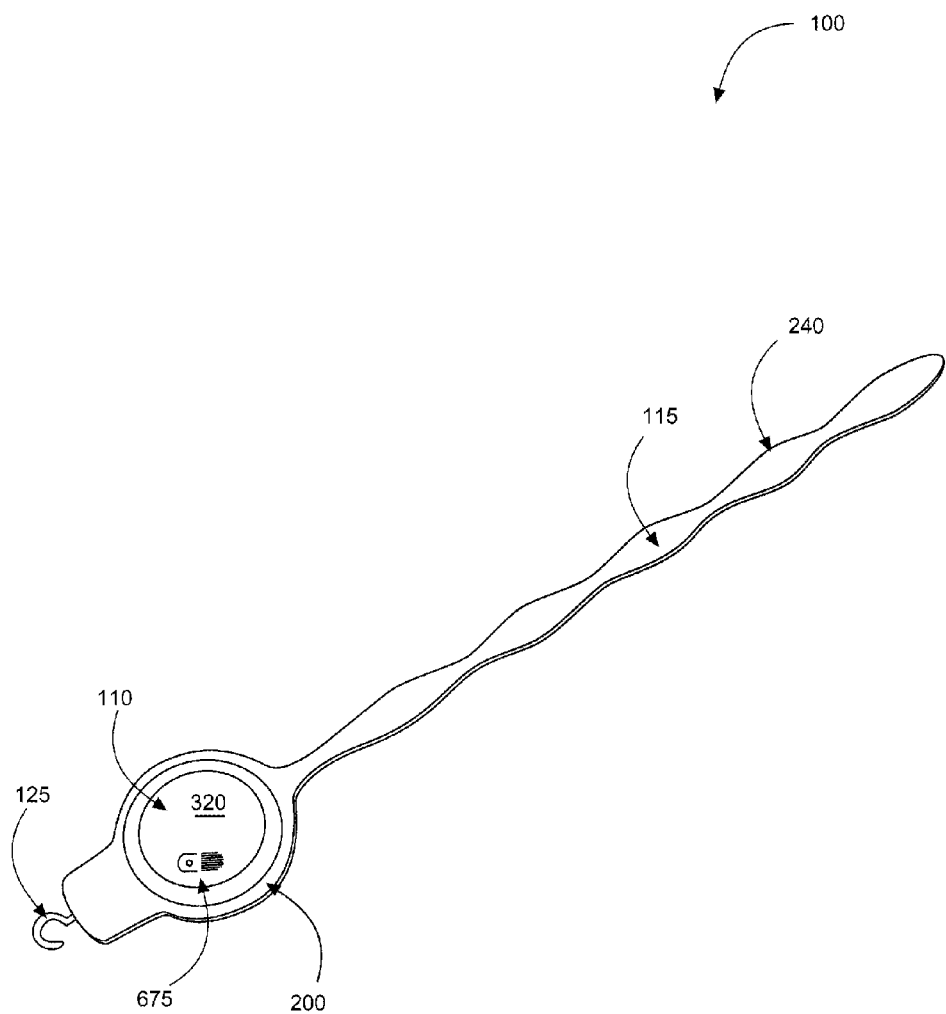
FIG. 4 is a front perspective view illustrating the detector extender support system retaining a detector according to an embodiment of the present invention of FIG. 1.

Referring now to FIGS. 3 and 4, illustrating perspective views of detector extender support system 100. As shown in FIG. 3, detector mechanism 110 (that is battery operated detector) generally comprises detector base member 310 and detector cover 320. Detector extender support system 100 comprises at least one set of screws 300 for securing detector mechanism 110 to extender handle 115. As shown, detector base member 310 may be secured to extender handle 115 via screws 300. Preferably, screws 300 comprise round head Philips screws.

To attach detector base member 310 to detector support 200, user 140 may place detector base member 310 on the flat surface of detector support 200 and line up screw holes 210 located on detector support 200 with the screw hole openings provided within a bottom portion of detector base member 310. It should be noted that screw holes 210 may comprise a small puncture in the surface of detector support 200 and user 140 may need to use a power screw driver or drill to securably install detector base member 310 to detector support 200 via screws 300. Once detector base member 310 is installed to detector support 200, user 140 need only secure detector cover 320 to detector base member 310. Detector cover 320 may comprise batteries 330 for operating detector mechanism 110 in 'in-use condition' 150. It should be noted that batteries 330 may comprise AA batteries, AAA batteries, or other battery depending on the make and manufacture of detector mechanism 110.

FIG. 4 shows a perspective view of detector mechanism 110 securably fastened to detector support 200 of extender handle 115. As shown in FIG. 4, detector cover 320 is attached to detector base member 310 thereby forming detector mechanism 110. Conventionally, detector base member 310 may comprise a slot or groove space and detector cover 320 comprises a lip or a ridge that screws into the groove space of detector base member 310 as best seen in FIG. 3. However, it should be noted that detector cover 320 may snap into detector base member 310 depending on the type of detector mechanism 110 that is being used.

Figure 5:
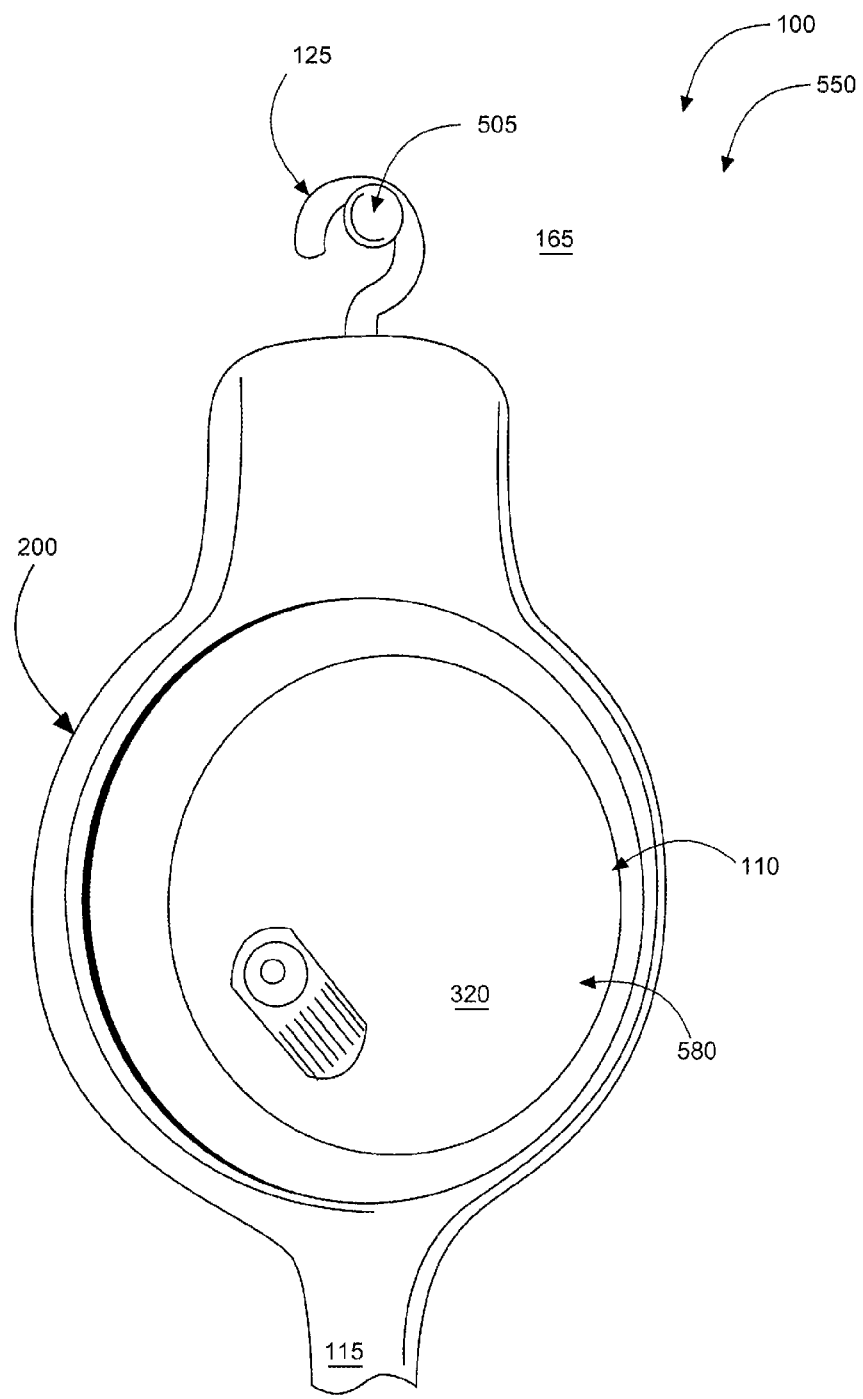
FIG. 5 is a close-up perspective view illustrating a cup hook component of the detector extender support system in another 'in-use condition' according to an embodiment of the present invention of FIG. 1.

Turning now to FIG. 5, illustrating a close-up perspective view of detector extender support system 100 in another 'in-use' condition 550 according to an embodiment of the present invention of FIG. 1. As shown, wall fastener 505, comprising a nail, screw, or other suitable fastener, and may be inserted into wall surface 165 in a user-preferred location close to the ceiling. Once wall fastener 505 is inserted into wall surface 165, detector extender support system 100 may thereby be hung by user 140 using cup hook 125 as shown in FIG. 5. Detector mechanism 110 may comprise carbon monoxide alarm 680.

Figure 6:
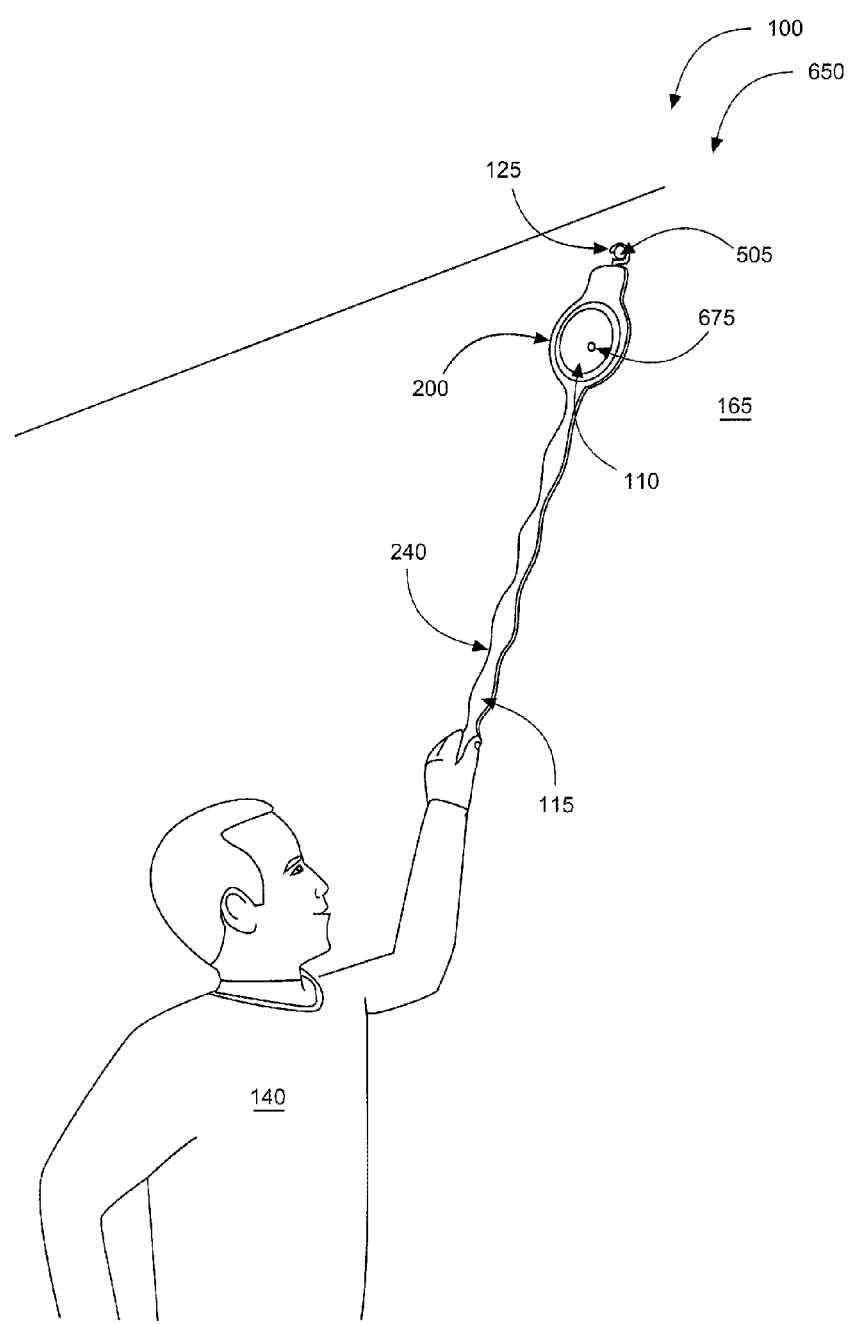
FIG. 6 is a perspective view illustrating the detector extender support system in another 'in-use' condition according to an embodiment of the present invention of FIG. 1.

FIG. 6 is a perspective view of detector extender support system 100 in 'in-use' condition 650 for use with detector mechanism 110 according to an embodiment of the present invention. As shown, detector extender support system 100 may comprise extender handle 115. As stated above, extender handle 115 preferably comprises a distal end and a proximal end wherein extender handle 115 comprises finished wood. The distal end of extender handle 115 comprises detector support 200. Detector support 200 comprises round, disk-shaped member comprising a substantially planar surface for supporting detector mechanism 110, wherein detector mechanism 110 may comprise a standard battery-operated detector, such as smoke alarm 675, carbon monoxide alarm 680, security system 685, motion detector 690, or the like. Further, detector support 200 may comprise at least two screw holes 210 on opposite ends of detector support 200. In such a manner, detector mechanism 110 may be mounted and fastened to detector support 200 via screws 300. For purposes of the convenience of user 140, wall fastener 505 may be provided with the present invention. In one embodiment, wall fastener 505 may comprise a nail. In alternative embodiments, wall fastener 505 may comprise a suitable hanging device which may be colorful or adorned with a design for aesthetic purposes.

Detector extender support system 100 may further comprise cup hook 125 which may be securely attached to a top surface of the distal end of extender handle 115. In such a manner, detector extender support system 100 may be hung from wall fastener 505 comprising a nail or a screw via cup hook 125. The proximal end of extender handle 115 comprises an extender handle comprising a curvy profile. The curvy profile of extender handle 115 comprises a plurality of handle curves 240 wherein each handle curve 240 provides an ergonomic gripping surface for user 140. In such a manner, user 140 comprising different heights and hand sizes may comfortably grip extender handle 115 via handle curve 240 and thereby may remotely manipulate detector mechanism 110 during an in-use condition 650 as shown in FIG. 6.

In alternative embodiments of the present invention not shown in FIGS. 1-6, extender handle 115 may be longer or shorter to accommodate various ceiling heights. Furthermore, detector extender support system 100 may comprise different designs, indicia, or drawings on extender handle 115. This may increase the aesthetic appeal of detector extender support system 100 during 'in-use' conditions 150, 550, and 650.

FIG. 7 shows flowchart 750 illustrating method of use 700 of detector extender support system 100 according to a preferred embodiment of the present invention of FIGS. 1-6. Method of use 700 may comprise the steps of: step one 701 driving wall fastener 505 into wall surface 165, step two 702 fastening base member 310 to the detector support 200 via screws 300, step three 703 attaching detector cover 320 to detector base member 310, step four 704 hanging extender handle 115 onto wall fastener 505, and step five 705 remotely removing extender handle 115 from wall fastener 505 to manipulate detector mechanism 110.

It should be noted that step five 705 is an optional step and may not be implemented in all cases. Optional steps of method 700 are illustrated using dotted lines in FIG. 7 so as to distinguish them from the other steps of method 700.

It should be noted that the steps described in the method of use can be carried out in many different orders according to user preference. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

Detector extender support system 100 may provide user 140 with a convenient and effective method for accessing detector mechanism 110 comprising a battery operated detector mechanism such as smoke alarm 675, carbon monoxide alarm 680, security system 685, motion detector 690, or the like in order to check or change the batteries or deactivate the alarm without the use of ladders or other elevation devices. After the alarm has been silenced or the batteries have been checked and/or changed, consumers may use extender handle 115 to return detector mechanism 110 to its previous position on wall surface 165. It should be appreciated that extender handle 115 may be made in different lengths to accommodate walls of various heights. Further detector extender support system 100 may be available in a variety of colors to suit user preferences.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. An extender support handle for use with a battery-operated detector comprising:
    at least one extender handle having at least one distal end and at least one proximal end;
    at least one detector support;
    at least one set of screws;
    at least one wall fastener; and
    at least one hook;
    wherein said battery-operated detector comprises a detector base member and a detector cover;
    wherein said distal end of said at least one extender handle comprises said detector support;
    wherein said proximal end of said extender handle comprises a plurality of curves;
    wherein said detector support comprises a round-shaped planar surface;
    wherein said hook is securably attached to a top surface of said distal end of said extender handle;
    wherein said detector base member is fastenable to said detector support via said at least one set of screws;
    wherein said detector cover is securable to said detector base member; and
    wherein said extender support handle hangs from said wall fastener thereby enabling a user to remotely access said battery-operated detector from a hard-to-reach wall surface.

2. The extender support handle of claim 1, wherein said detector support comprises at least two screw holes.

3. The extender support handle of claim 1, wherein said screws are round head screws.

4. The extender support handle of claim 3, wherein said round head screws are Philips screws.

5. The extender support handle of claim 1, wherein said extender handle comprises finished wood.

6. The extender support handle of claim 1, wherein said extender handle comprises plastic.

7. The extender support handle of claim 1, wherein said curve(s) of said extender handle comprises an ergonomic profile for handling.

8. The extender support handle of claim 7, wherein said ergonomic profile improves turning leverage.

9. The extender support handle of claim 1, wherein said plurality of curves enables said user comprising different heights to remotely manipulate said extender support handle.

10. The extender support handle of claim 1, wherein said hook comprises a cup hook.

11. The extender support handle of claim 1, wherein said battery operated detector comprises a smoke alarm.

12. The extender support handle of claim 1, wherein said battery operated detector comprises a carbon monoxide alarm.

13. The extender support handle of claim 1, wherein said battery operated detector comprises a security system.

14. The extender support handle of claim 1, wherein said battery operated detector comprises a motion detection device.

15. The extender support handle of claim 1, wherein said proximal end of said extender handle comprises a spiral profile.

16. The extender support handle of claim 1, wherein said extender handle is hangable on a wall fastener.

17. The extender support handle of claim 1, wherein said wall fastener comprises a nail.

18. An extender support handle for use with a battery-operated detector comprising a smoke alarm comprising:
    at least one extender handle comprising finished wood having a distal end and a proximal end;
    at least one detector support comprising a round-shaped planar surface, said detector support further comprising at least two screw holes;
    at least one set of screws comprising round head Philips screws;
    at least one wall fastener comprising a nail;
    at least one hook comprising a cup hook;
    wherein said battery-operated detector comprises a detector base member and a detector cover;
    wherein said distal end of said at least one extender handle comprises said detector support;
    wherein said proximal end of said extender handle comprises a plurality of curves wherein said curve(s) comprises an ergonomic profile for handling said extender handle, wherein said ergonomic profile improves turning leverage of said extender handle, and wherein said curves enables a user of varying heights to remotely manipulate said detector support;
    wherein said cup hook is securably attached to a top surface of said distal end of said extender handle;
    wherein said detector base member is fastenable to said detector support via said at least one set of screws;
    wherein said detector cover is securable to said detector base member; and
    wherein said extender support handle hangs from said wall fastener thereby enabling a user to remotely access said battery-operated detector mechanism from a hard-to-reach wall surface.

19. A method of using an extender support handle to manipulate a detector comprising the steps of:
    driving a wall fastener into a wall surface at a desired detector location;
    screwing a detector base member to a detector support;
    attaching a detector cover to said detector base member;
    using extender support handle to hang extended detector support system with detector attached from wall fastener by cup hook; and
    remotely removing detector.

20. The method of using said extender support handle of claim 19 further comprising the step of removing said extender support handle from said wall fastener to access said detector for checking or changing batteries or clearing alarm of said detector.

* * * * *